(12) United States Patent
Klaehn et al.

(10) Patent No.: US 7,772,361 B2
(45) Date of Patent: Aug. 10, 2010

(54) POLYBENZIMIDAZOLE COMPOUNDS

(75) Inventors: John R. Klaehn, Idaho Falls, ID (US); Eric S. Peterson, Idaho Falls, ID (US); Alan K. Wertsching, Idaho Falls, ID (US); Christopher J. Orme, Shelley, ID (US); Thomas A. Luther, Idaho Falls, ID (US); Michael G. Jones, Pocatello, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 12 days.

(21) Appl. No.: 11/772,868

(22) Filed: Jul. 3, 2007

(65) Prior Publication Data
US 2009/0012253 A1    Jan. 8, 2009

Related U.S. Application Data

(62) Division of application No. 10/862,921, filed on Jun. 7, 2004, now Pat. No. 7,259,230.

(51) Int. Cl.
*C08G 73/18*    (2006.01)
*C08G 73/06*    (2006.01)

(52) U.S. Cl. .................. 528/423; 528/398; 528/482; 528/485; 528/487; 528/488; 528/503; 524/858; 524/869; 525/540

(58) Field of Classification Search .................. 528/423, 528/398, 482, 485, 487, 488, 503; 524/858; 524/869; 525/540
See application file for complete search history.

(56) References Cited

U.S. PATENT DOCUMENTS

| | | |
|---|---|---|
| RE26,065 E | 7/1966 | Marvel et al. |
| 3,408,366 A | 10/1968 | White |
| 3,518,234 A | 6/1970 | Hara et al. |
| 3,549,603 A | 12/1970 | Chenevey et al. |
| 3,578,644 A | 5/1971 | Trischler |
| 3,598,767 A | 8/1971 | Kovacs et al. |
| 3,708,439 A | 1/1973 | Sayigh et al. |

(Continued)

OTHER PUBLICATIONS

Roziere, Jacques and Jones, Deborah, *Non-Fluorinated Polymer Materials for Proton Exchange Membrane Fuel Cells*, Annu. Rev. Mater. Res. 2003, vol. 33, pp. 503-555.

(Continued)

*Primary Examiner*—Duc Truong
(74) *Attorney, Agent, or Firm*—TraskBritt

(57) ABSTRACT

A PBI compound that includes imidazole nitrogens, at least a portion of which are substituted with an organic-inorganic hybrid moiety. At least 85% of the imidazole nitrogens may be substituted. The organic-inorganic hybrid moiety may be an organosilane moiety, for example, $(R)Me_2SiCH_2-$, where R is selected from among methyl, phenyl, vinyl, and allyl. The PBI compound may exhibit similar thermal properties in comparison to the unsubstituted PBI. The PBI compound may exhibit a solubility in an organic solvent greater than the solubility of the unsubstituted PBI. The PBI compound may be included in separatory media. A substituted PBI synthesis method may include providing a parent PBI in a less than 5 wt % solvent solution. Substituting may occur at about room temperature and/or at about atmospheric pressure. Substituting may use at least five equivalents in relation to the imidazole nitrogens to be substituted or, preferably, about fifteen equivalents.

18 Claims, 10 Drawing Sheets

U.S. PATENT DOCUMENTS

| | | | |
|---|---|---|---|
| 3,943,125 | A | 3/1976 | Gerber |
| 4,020,142 | A | 4/1977 | Davis et al. |
| 4,154,919 | A | 5/1979 | Sheratte |
| 4,312,976 | A | 1/1982 | Choe |
| 4,483,977 | A | 11/1984 | Conciatori et al. |
| 4,530,922 | A | 7/1985 | Mogerg |
| 4,599,388 | A | 7/1986 | Bower et al. |
| 4,693,824 | A | 9/1987 | Sansone |
| 4,693,825 | A | 9/1987 | Trouw |
| 4,759,986 | A | 7/1988 | Marikar et al. |
| 4,771,117 | A | 9/1988 | Citron et al. |
| 4,814,399 | A | 3/1989 | Sansone et al. |
| 4,814,400 | A | 3/1989 | Sansone |
| 4,868,249 | A | 9/1989 | Sansone |
| 4,898,917 | A | 2/1990 | Sansone |
| 4,933,397 | A | 6/1990 | Sansone et al. |
| 4,997,892 | A | 3/1991 | Sansone et al. |
| 5,017,420 | A | 5/1991 | Marikar et al. |
| 5,290,884 | A | 3/1994 | Calundann et al. |
| 5,389,326 | A | 2/1995 | Kasowski et al. |
| 5,599,639 | A | 2/1997 | Sansone et al. |
| 5,945,233 | A | 8/1999 | Onorato et al. |
| 6,124,060 | A | 9/2000 | Akita et al. |
| 6,221,343 | B1 | 4/2001 | Richard et al. |
| 6,323,301 | B1 | 11/2001 | Smith et al. |
| 6,790,553 | B1 | 9/2004 | Yamamoto |
| 6,916,865 | B2 | 7/2005 | Kumagai et al. |
| 6,997,971 | B1 | 2/2006 | Young et al. |
| 7,235,320 | B2 | 6/2007 | Calundann et al. |
| 7,432,335 | B2 | 10/2008 | Kumagai et al. |
| 2007/0099035 | A1 | 5/2007 | Li et al. |
| 2007/0100078 | A1 | 5/2007 | Li et al. |
| 2009/0018277 | A1 | 1/2009 | Okamoto et al. |
| 2009/0056795 | A1 | 3/2009 | Kang et al. |

OTHER PUBLICATIONS

Burns, Ryan and Koros, William, *Structure—Property Relationships for Poly(pyrrolone-imide) Gas Separation Membranes*, Macromolecules 2003, 36, pp. 2374-2381.

Schuster, Martin F.H. and Meyer, Wolfgang, *Anhydrous Proton-Conducting Polymers*, Annu. Rev. Mater. Res, 2003, vol. 33, pp. 233-261.

Haile, Sossina M., *Fuel Cell Materials and Components*, Science Direct, Acta Materialia 51, 2003, pp. 5981-6000.

Wijmans, J.G. and Baker R.W., *The Solution-Diffusion Model: A Review*, Journal of Membrane Science 107, 1995, pp. 1-21.

Jones, Deborah and Roziere, Jacques, *Recent Advances in the Functionalisation of Polybenzimidazole and Polyetherketone for Fuel Cell Applications*, Journal of Membrane Science 185, 2001, pp. 41-58.

Barrer, R.M., Tras. Faraday Soc. 1939, vol. 35, p. 628.

Rogers, C., et al, *Studies in the Gas and Vapor Permeability of Plastic Films and Coated Papers, Parts I and II*, TAPPI 1956, vol. 39, p. 737.

Vogel, Herward and Marvel, C.S., *Polybenzimidazoles, New Thermally Stable Polymers*, Journal of Polymer Science, vol. L, 1961, pp. 511-539.

Gieselman, Melinda and Reynolds, John, *Aramid and Imidazole Based Polyelectrolytes: Physical Properties and Ternary Phase Behavior with Poly(Benzobisthiazole) in Methanesulfonic Acid*, Macromolecules, 1993, vol. 26, pp. 5633-5642.

Gieselman, Melinda and Reynolds, John, *Water-Soluable Polybenzimidazole-Based Polyelectrolytes*, Macromolecules, 1992, vol. 25, pp. 4832-4834.

Van Amerongen, G.J., *Permeation, Diffusion and Solution of Gases in Organic-inorganic hybrid moiety Polymers*, J. App. Physics, 1946, vol. 17, p. 972.

M. Chanda and G. L. Rempel, *Polybenzimidazole resin-based new chelating agents. Uranyl and ferric ion selectivity of resins with anchored dimethylglyoxime*, Reactive Polymers, vol. 11, 1989, pp. 165-176.

M. Chanda and G. L. Rempel, *Polybenzimidazole resin based new chelating agents, Palladium(II) and platinum(IV) sorption on resin with immobilized dithiooxamide*, Reactive Polymers, vol. 12, Issue 1, Feb. 1990, pp. 83-94.

M. Chanda, G. L. Rempel, *Polybenzimidazole resin based new chelating agents uranyl ion selectivity of resins with immobilized glyoxal-bis-2-hydroxyanil and salicylaldehyde-ethylenediimine*, Reactive Polymers, vol. 13, Issues 1-2, Sep. 1990, pp. 103-119.

M. H. Kotze, B. R. Green and P. Ellis, *Fibrous weak-base anion exchangers from a polybenzimidazole staple for the extraction of gold cyanide*, Reactive Polymers, vol. 14, Issue 2, Mar. 1991, pp. 129-141.

M. Chanda and G. L. Rempel, *New chelating resins based on polybenzimidazole. Selective sorption of copper(II) from ammoniacal media on resin with anchored $_L$-cysteine*, Reactive Polymers, vol. 16, Issue 1, Dec. 1991, pp. 29-39.

M. Chanda and G. L. Rempel, *Removal of uranium from acidic sulfate solution by ion exchange on poly(4-vinylpyridine) and polybenzimidazole in protonated sulfate form*, Reactive Polymers, vol. 17, Issue 2, May 1992, pp. 159-174.

James D. White, Paul R. Blakemore, Selena Milicevic, Satish C. Choudhry, Joseph Cupano, and Lucia Serico, *Conversion of Carbamates to Amidosulfones and Amides. Synthesis of the [$^{14}C$]-Labeled Antiobesity Agent Ro23-7637*. Org. Lett., 2002, 4(10) pp. 1803-1806.

Hirokazu Sumiyoshi, Takafurni Shimizu, Miho Katoh, Yoshiyasu Baba, and Mikiko Sodeoka, *Solution-Phase Parallel Synthesis of Carbamates Using Polymer-Bound N-Hydroxysuccinimide*, Org. Lett.; 2002; 4(22) pp. 3923-3926.

Amanda R. Murphy, Jean M. J. Fréchet, Paul Chang, Josephine Lee, and Vivek Subramanian, *Organic Thin Film Transistors from a Soluble Oligothiophene Derivative Containing Thermally Removable Solubilizing Groups [J. Am. Chem. Soc. 2004, 126, 1596-1597]*. J. Am. Chem. Soc.; 2004; 126(37) pp. 1750-1751.

Zhiyong Luo, John Williams, Roger W. Read, and Dennis P. Curran, *Fluorous Boc ($^FBoc$) Carbamates: New Amine Protecting Groups for Use in Fluorous Synthesis*, J. Org. Chem.; 2001; 66(12) pp. 4261-4266.

John D. Bass and Alexander Katz, *Thermolytic Synthesis of Imprinted Amines in Bulk Silica*, Chem. Mater.; 2003; 15(14) pp. 2757-2763.

David Mecerreyes, Hans Grande, Oscar Miguel, Estibalitz Ochoteco, Rebeca Marcilla, and Igor Cantero, *Porous Polybenzimidazole Membranes Doped with Phosphoric Acid: Highly Proton-Conducting Solid Electrolytes*, Chem. Mater.; 2004; 16(4) pp. 604-607.

Wainright, J.S., Wang, J-T., Weng, D., Savinell, R.F., and M.H. Litt, "*Acid-Doped Polybenzimidazoles, A New Polymer Electrolyte*," J. Electrochem. Soc., 142, L121-L123 (1995).

B. Xing and O. Savadogo, J. New. Mat. Electrochem. Systems 2, 95 (1999).

Trischler et al., "Substituted Aliphatic Polybenzimidazoles as Membrane Separator Materials," Journal of Applied Polymer Science, vol. 13, pp. 101-106 (1969).

FIG. 8 $^{13}C\{^1H\}$ NMR of $Me_3SiCH_2$-(PBI) (1) in $CDCl_3$.

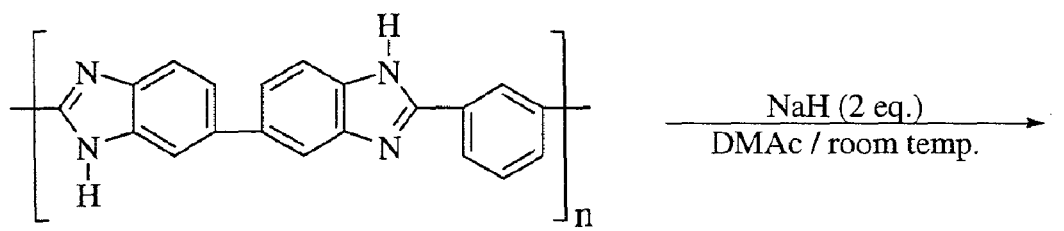
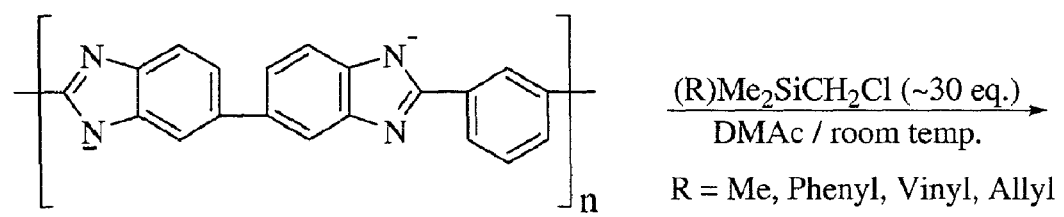
R = Me, Phenyl, Vinyl, Allyl
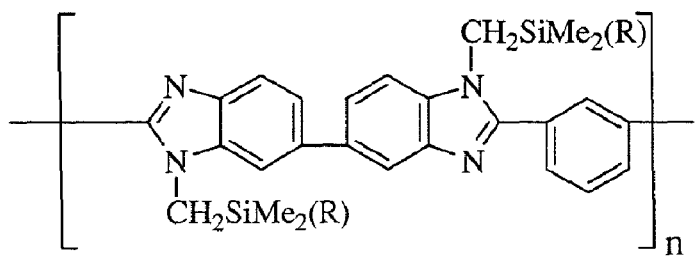
(1) R = Me
(2) R = Phenyl
(3) R = Vinyl
(4) R = Allyl
FIG. 9

POLYBENZIMIDAZOLE COMPOUNDS

CROSS-REFERENCE TO RELATED APPLICATIONS

This application is a divisional of U.S. patent application Ser. No. 10/862,921, entitled POLYBENZIMIDAZOLE COMPOUNDS, POLYMERIC MEDIA, AND METHODS OF POST-POLYMERIZATION MODIFICATIONS, filed Jun. 7, 2004, now U.S. Pat. No. 7,259,230, issued Aug. 21, 2007. This application is also related to U.S. patent application Ser. No. 10/969,456, filed Oct. 19, 2004, now U.S. Pat. No. 7,309,758, issued Dec. 18, 2007.

GOVERNMENT RIGHTS

This invention was made with government support under Contract No. DE-AC07-99ID13727 and Contract No. DE-AC07-05ID14517 awarded by the United States Department of Energy. The government has certain rights in this invention.

TECHNICAL FIELD

The invention pertains to polybenzimidazole compounds, polymeric media including polybenzimidazole compounds, and methods of making post-polymerization molecular modifications.

BACKGROUND OF THE INVENTION

Polybenzimidazole (PBI) constitutes a well-known class of heterocyclic polymers and is described, merely by way of example and not limitation, in U.S. Pat. No. 4,898,917 issued to Sansone. One PBI known as poly-2,2'(m-phenylene)-5,5'-bibenzimidazole has been used, as well as other PBI compounds, to form ionically conductive materials, fire resistant materials, and various types of separatory media, such as membranes and ultrafilters. Poly-2,2'(m-phenylene)-5,5'-bibenzimidazole is resistant to strong acids, bases, and high temperatures up to 500° C., but exhibits very poor solubility in common organic solvents. It is soluble under harsh conditions in highly polar, aprotic organic solvents, such as dimethyl sulfoxide (DMSO), N,N-dimethylacetamide (DMAc), N,N-dimethylformamide (DMF), and N-methylpyrrolidinone (NMP), which exhibit high boiling points and low vapor pressures. Accordingly, such solvents are not preferred for polymer processing.

As such, it would be advantageous to modify a PBI, such as poly-2,2'(m-phenylene)-5,5'-bibenzimidazole, to exhibit better solubility in common organic solvents more preferable for polymer processing. Also, an appropriate method for modifying PBI would be advantageous.

SUMMARY OF THE INVENTION

According to one aspect of the invention, a PBI compound includes imidazole nitrogens, at least a portion of which are substituted with an organic-inorganic hybrid moiety. By way of example, the compound may be substituted poly-2,2'(m-phenylene)-5,5'-bibenzimidazole. At least 85% of the imidazole nitrogens may be substituted with the organic-inorganic hybrid moiety, but substantially all can be substituted. The organic-inorganic hybrid moiety may be an organosilane moiety, for example, (R)Me$_2$SiCH$_2$—, where R is selected from the group consisting of methyl, phenyl, vinyl, and allyl and Me designates methyl. The PBI compound may exhibit a temperature marking an onset of decomposition that is greater than a value representing 80% of a temperature marking an onset of decomposition of the PBI without substitution. The PBI compound may exhibit solubility in an organic solvent greater than the solubility of the PBI without substitution. The organic solvent may include tetrahydrofuran (THF), chloroform, or dichloromethane.

According to another aspect of the invention, a polymeric medium includes a PBI compound having imidazole nitrogens, at least a portion of which are substituted with an organic-inorganic hybrid moiety.

According to a further aspect of the invention, a substituted PBI synthesis method includes providing PBI having imidazole nitrogens, reacting the PBI with an organic-inorganic hybrid compound, and substituting at least a portion of the imidazole nitrogens with an organic-inorganic hybrid moiety from the organic-inorganic hybrid compound. By way of example, the PBI may be provided in a less than 5 wt % solution of the PBI in a solvent, such as about 2.5 wt %. The method may further include ionizing the imidazole nitrogens before the reacting. The ionizing may involve deprotonating with an alkali metal hydride. The ionizing, reacting, and/or substituting may occur at a temperature from about 20° C. to about 30° C. and/or at about atmospheric pressure. Reacting the PBI with an organic-inorganic hybrid compound may use at least five equivalents of the organic-inorganic hybrid compound in relation to the imidazole nitrogens to be substituted, such as about ten to fifteen equivalents. The organic-inorganic hybrid compound may be an organohalosilane, for example, (R)Me$_2$SiCH$_2$Cl, where R is selected from the group consisting of methyl, phenyl, vinyl, and allyl.

According to a still further aspect of the invention, a polymeric medium fabrication method includes providing PBI having imidazole nitrogens, reacting the PBI with an organic-inorganic hybrid compound, substituting at least a portion of the imidazole nitrogens with an organic-inorganic hybrid moiety from the organic-inorganic hybrid compound, and forming a polymeric medium that comprises the substituted PBI.

BRIEF DESCRIPTION OF THE DRAWINGS

Preferred embodiments of the invention are described below with reference to the following accompanying drawings.

FIG. 9 shows a reaction sequence that forms polybenzimidazole (PBI) substituted with an organic-inorganic hybrid moiety.

DETAILED DESCRIPTION OF THE INVENTION

Figure 1:
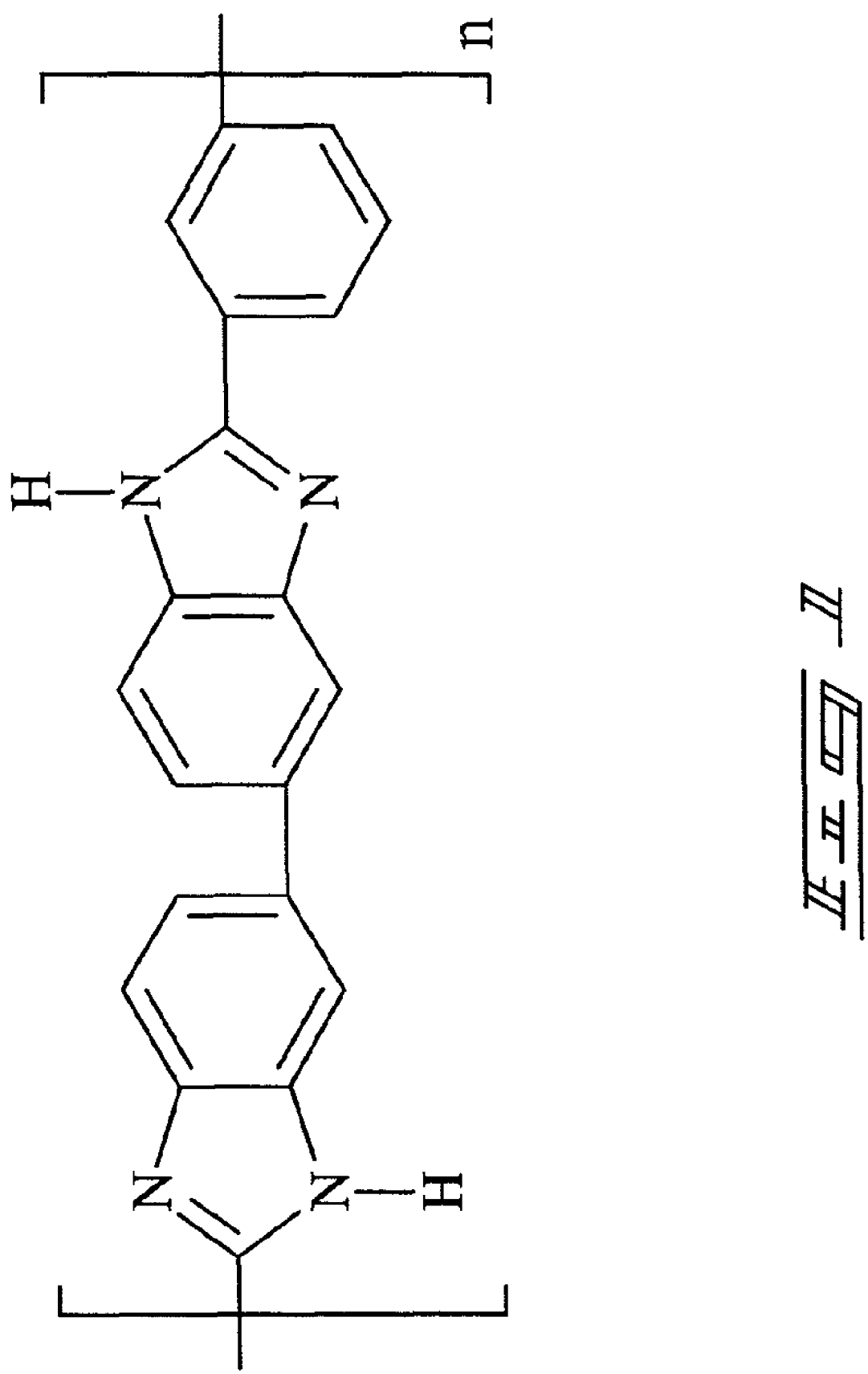
FIG. 1 shows a chemical structure of poly-2,2'(m-phenylene)-5,5'-bibenzimidazole.

PBI may be synthetically modified to produce a polymer soluble in a wider range of organic solvents, including those preferred for polymer processing. The synthetic modification can be accomplished by exploiting the reactive imidazole nitrogens of PBI with polymer substitution (grafting) or by altering monomers and subsequently forming the desired polymer. Since a variety of PBI compounds can be acquired commercially, substitution of the polymer is preferred. Altering monomers and subsequently forming the desired polymer can be difficult and the resulting polymer molecular morphology can be considerably different from the intended parent PBI. However, previous attempts to enhance PBI solubility in common solvents by substitution of PBI have been met with little success.

Some of the attempts at modifying PBI that rely upon the reactive imidazole nitrogens include substitution, as well as cross-linking (U.S. Pat. Nos. 4,020,142 and 4,154,919). Blending PBI with aromatic polyamides, aromatic polyamide-hydrazides, and aromatic polyamides with heterocyclic linkages is also known (U.S. Pat. No. 5,290,884). However, in all of such efforts, solubility of the PBI remains a problem and the typical product forms a paste or gel (referred to in the industry as a "dope") in strong acidic conditions. Substitution of PBI includes modification with an omega halo alkanol or a 1,2-alkylene oxide to make hydroxyl substituted PBI (U.S. Pat. No. 3,578,644). Other pathways are known to produce hydroxyl substituted PBI (U.S. Pat. No. 4,599,388). Substituted PBI has also been formed by reacting substituted tetra-amino pyridines or their organic salts with a suitable acid halide or acid anhydride and cross-linking the result to yield PBI (U.S. Pat. No. 3,943,125). N-aryl substituted PBI is also known (U.S. Pat. No. 3,518,234). However, in each circumstance no increase of polymer solubility in common solvents was described.

In a series of patents, Sansone et al. describe a variety of pathways for substitution of PBI (U.S. Pat. Nos. 4,814,399, 4,997,892, 4,814,400, 4,868,249, 4,898,917, and 4,933,397). Even so, no indication is given that any of the resulting substituted PBI exhibited a solubility increase in common solvents compared to the original PBI. It is apparent from the deficiencies of the conventional products resulting from known PBI modification methods that it would be an advantage to provide a modified PBI that exhibits enhanced solvent solubility.

In addition, the methods described in the Sansone patents listed above used process conditions only obtainable with specialized equipment. For example, such methods include reaction temperatures greater than 50° C., reaction pressures greater than two atmospheres, and a PBI concentration in the starting polymer solution of greater than 5 weight percent (wt %). Such conditions were obtained with heated and pressurized reaction chambers and a relatively viscous polymer solution that all complicated production of a substituted PBI. The maximum degree of substitution was 82% and higher relative concentrations of reactants did not increase the degree of PBI substitution. Also, U.S. Pat. No. 4,898,917 states that when the polymer solution contains less than about 5% concentration of PBI, the substitutions obtained are less than optimum.

As may be appreciated, a variety of areas exist wherein conventional PBI compounds and methods of making such compounds may be improved. According to one aspect of the invention, a PBI compound includes imidazole nitrogens, at least a portion of which are substituted with an organic-inorganic hybrid moiety. As one example, the PBI compound may be a substituted poly-2,2'(m-phenylene)-5,5'-bibenzimidazole, as well as other substituted PBI compounds. At least 85% of the imidazole nitrogens may be substituted with the organic-inorganic hybrid moiety, though preferably, substantially all of the imidazole nitrogens are so substituted.

As will be understood by those of ordinary skill in the art, conventional analysis may be used to determine the approximate degree of substitution. Since the molecular weight of PBI can be rather high, some small number of imidazole nitrogens might be cross-linked or otherwise not substituted by the organic-inorganic hybrid moiety. Yet, within the sensitivity of conventional analytic techniques, the PBI may give an indication that all of the imidazole nitrogens are so substituted. Understandably then, when "substantially all" of the imidazole nitrogens are so substituted, a small number of nitrogens may be cross-linked or otherwise not substituted, but such a smaller number would be insignificant in light of the purposes described herein for improvement upon conventional PBI compounds.

Also, although a preference exists for substitution of the imidazole nitrogens with a single compound, such as the organic-inorganic hybrid moiety, it is conceivable that multiple different compounds may be used. Organosilane compounds constitute one class of moieties possessing significant advantages previously unrecognized. Some organosilane moieties demonstrated to impart beneficial properties include $(R)Me_2SiCH_2-$, where R is selected from the group consisting of methyl, phenyl, vinyl, and allyl. Even so, other organosilane moieties may be advantageous as well.

In general, the organic-inorganic hybrid moiety may be $(R)_nMR'-$, wherein n is 1, 2, or 3, each R is independently selected from among alkyl, aryl, alkenyl, alkynyl, and oxide, M is metal, semi-metal, or phosphorous, and R' is $C_1$ to $C_{20}$ alkyl. Thus, instead of silicon as the inorganic portion of an organic-inorganic hybrid moiety, other inorganic elements might provide similar, different, or additional advantages. The organic portion(s) of the moiety might also be evaluated and selected to obtain certain benefits. The inorganic portion(s) may be metals, semi-metals, or non-metals and include, but are not limited to, scandium, yttrium, titanium, zirconium, hafnium, vanadium, niobium, molybdenum, tungsten, iron, ruthenium, cobalt, rhodium, nickel, palladium, platinum, boron, aluminum, gallium, indium, silicon, germanium, tin, phosphorous, arsenic, antimony, sulfur, selenium, and tellurium, as well as their oxides. The organic-inorganic hybrid moiety may include at least one element selected from the group consisting of metals, semi-metals, and phosphorous. Accordingly, silicon along with another metal, semi-metal, phosphorous, or sulfur may be advantageous.

Many unsubstituted PBI compounds used in commercial applications are known for their stability and advantageous thermal properties, such as a high glass transition temperature $(T_g)$. The $T_g$ of poly-2,2'(m-phenylene)-5,5'-bibenzimidazole is 435° C. Substitution of PBI can potentially modify thermal properties of the parent compound and diminish the advantageous thermal stability. Accordingly, a substituted PBI in keeping with the aspects of the invention may exhibit similar, or even improved, thermal stability in comparison to the unsubstituted PBI. For example, a substituted PBI may exhibit a temperature marking the onset of decomposition that is greater than a value representing 80% of a temperature marking the onset of decomposition of the unsubstituted PBI. The temperature marking the onset of the substituted PBI's decomposition may be greater than a value representing 90% of the temperature marking the onset of the unsubstituted PBI's decomposition. Conceivably, the temperature marking the onset of the substituted PBI's decomposition may even be greater than the temperature marking the onset of the unsubstituted PBI's decomposition. Even though it may be desirable in many situations for the thermal properties of the PBI to remain largely unchanged after substitution, it may be desirable for the substitution to intentionally alter thermal properties. For example, substitution may lower the temperature marking the onset of decomposition.

Unsubstituted or substituted conventional PBI is known to exhibit poor solubilities in common solvents. Such property is demonstrated at least in U.S. Pat. No. 4,898,917 issued to Sansone and discussed above. It is apparent from the teachings of Sansone that the poly-2,2'(m-phenylene)-5,5'-bibenzimidazole was difficult to use, prompting processing with a highly polar, aprotic organic solvent at elevated temperatures and pressures in a Parr bomb to completely dissolve the PBI into solution. Even so, the polymer solution was quite viscous and filtering to remove undissolved PBI was recommended. Those of ordinary skill in the art encounter similar difficulties when attempting to fabricate products that include PBI.

Accordingly, it is a significant advantage that the PBI compound according to the aspects of the invention exhibits solubility in an organic solvent greater than the solubility of the unsubstituted PBI. The PBI compound may exhibit a solubility in tetrahydrofuran (THF), chloroform, or dichloromethane of at least about 0.01 grams per milliliter of solvent (g/mL), or preferably at least about 0.2 g/mL. Such solubility may be exhibited within about thirty minutes or less at room temperature. Longer periods for full dissolution to occur and/or higher temperatures are less preferred.

In another aspect of the invention, a polymeric medium includes a PBI compound having imidazole nitrogens, at least a portion of which are substituted with an organic-inorganic hybrid moiety. The PBI compound may have a similar composition and exhibit similar properties to those described above. As may be appreciated, maintaining thermal properties of the parent PBI and enhancing solvent solubility may be particularly advantageous in forming a polymeric medium. Maintaining resistance to harsh acid-base conditions may also be advantageous. The polymeric medium may be separatory, electronically conductive, and/or ionically conductive. The organic-inorganic hybrid moiety may include at least one element selected from the group consisting of metals, semi-metals, and phosphorous. Gallium, indium, silicon, germanium, tin, phosphorous, arsenic, and antimony are particularly suitable when the polymeric medium is an electrically and/or ionically conductive medium.

The term "separatory medium" encompasses a variety of materials, including but not limited to membranes (semipermeable, permeable, and non-permeable), barriers, ion exchange media, filters, gas chromatography coatings (such as stationary phase coatings in affinity chromatography), etc. The separatory medium, including such a substituted PBI compound, may exhibit a $H_2$, Ar, $N_2$, $O_2$, $CH_3$, and/or $CO_2$ gas permeability greater than the gas permeability of a comparable polymeric medium instead of comprising the unsubstituted PBI compound. The substituted PBI compound may be used and/or modified in the same manner that poly-2,2'(m-phenylene)-5,5'-bibenzimidazole or other known PBI compounds have been or may be used and/or modified by those of ordinary skill in the art to function as separatory media. For example, U.S. Pat. Nos. 4,693,824 and 4,693,825, both issued Sep. 15, 1987, as well as other references, describe forming separatory media.

Electronically conductive media may be membranes and/or materials that are useful in fabrication of nanowires, organic conductors, organic electronic devices, and the like. The substituted PBI compound may be used and/or modified in the same manner that poly-2,2'(m-phenylene)-5,5'-bibenzimidazole or other known PBI compounds have been or may be used and/or modified by those of ordinary skill to function as electronically conductive media. For example, U.S. Pat. No. 4,759,986, issued Jul. 26, 1988, and U.S. Pat. No. 5,017,420, issued May 21, 1991, as well as other references, describe forming electronically conductive media.

Ionically conductive media may be membranes and/or materials that are useful in fabrication of fuel cells, and the like, such as for proton exchange membranes and/or polymer electrolyte membranes. The substituted PBI compound is well-suited for the potentially corrosive environment of fuel cells. The substituted PBI compound may be used and/or modified in the same manner that poly-2,2'(m-phenylene)-5,5'-bibenzimidazole or other known PBI compounds have been or may be used and/or modified by those of ordinary skill to function as ionically conductive media. For example, U.S. Pat. No. 5,599,639, issued Feb. 4, 1997, U.S. Pat. No. 6,124,060, issued Sep. 26, 2000, as well as other references, describe forming ionically conductive media.

In addition to improved PBI compounds, aspects of the invention also include improvements in methods for making substituted PBI compounds and products comprising such compounds.

According to a further aspect of the invention, a substituted PBI synthesis method includes providing PBI having imidazole nitrogens, reacting the PBI with an organic-inorganic hybrid compound, and substituting at least a portion of the imidazole nitrogens with an organic-inorganic hybrid moiety from the organic-inorganic hybrid compound. By way of example, the PBI may be provided in a less than 5 wt % solution of the PBI in a solvent. Suitable solvents include DMSO, DMAc, DMF, NMP, and others known to those of ordinary skill. A 2.5 wt % solution of the PBI in a solvent has proven effective. The method may further include ionizing the imidazole nitrogens, for example, by deprotonating with an alkali hydride. Sodium hydride (NaH) and other alkali hydrides known to those of ordinary skill are suitable.

The organic-inorganic hybrid compound may include at least one element selected from the group consisting of metals, semi-metals, and phosphorous. An example is $(R)_n MR'X$, wherein n is 1, 2, or 3, each R is independently selected from among alkyl, aryl, alkenyl, alkynyl, and oxide, M is metal, semi-metal, or phosphorous, R' is $C_1$ to $C_{20}$ alkyl, and X is Cl, Br, or I.

One advantage of the method includes performing process steps at room temperature and/or pressure. Ionizing may occur at temperatures from about 20° C. to about 30° C. The reacting and substituting can occur at temperatures from about 20° C. to about 30° C. As another advantage, the ionizing, reacting, and/or substituting may occur at about atmospheric pressure. The reacting may use at least five equivalents of the organic-inorganic hybrid compound in relation to the imidazole nitrogens to be substituted. Preferably, the reacting uses about ten to fifteen equivalents of the organic-inorganic hybrid compound.

The use of such a high number of organic-inorganic hybrid compound equivalents contradicts the teachings of conventional processes, as indicated in U.S. Pat. No. 4,898,917, which indicates that greater than five equivalents fail to achieve significantly higher substitutions than obtained between one and five equivalents. The highest degree of substitution obtained in U.S. Pat. No. 4,898,917 was 82%. In accordance with the aspects of the present invention, substantially all of the imidazole nitrogens may be substituted with the organic-inorganic hybrid moiety. Observations indicated that a higher number of equivalents had the surprising effect of rendering the substituted PBI solvent soluble, while a substituted PBI, produced using five or less equivalents, only exhibited slight solvent solubility.

According to a still further aspect of the invention, a substituted PBI synthesis method includes providing PBI having imidazole nitrogens and deprotonating the imidazole nitrogens at a temperature from about 20° C. to about 30° C. in a less than 5 wt % solution of the PBI in a solvent. The method further includes reacting the deprotonated PBI with $(R)Me_2SiCH_2Cl$ at a temperature from about 20° C. to about 30° C., where R is selected from the group consisting of methyl, phenyl, vinyl, and allyl, and substituting substantially all of the imidazole nitrogens with $(R)Me_2SiCH_2$—.

According to another aspect of the invention, a separatory media fabrication method includes providing PBI having imidazole nitrogens, reacting the PBI with an organic-inorganic hybrid compound, substituting at least a portion of the imidazole nitrogens with an organic-inorganic hybrid moiety, and forming a separatory media that contains the substituted PBI. Providing, reacting, and substituting the PBI may be performed in accordance with the methods described above for substituted PBI synthesis. As an example, one advantage of separatory media formed by such method is that it may exhibit a $H_2$, Ar, $N_2$, $O_2$, $CH_3$, and/or $CO_2$ gas permeability greater than the gas permeability of a comparable separatory media that instead comprises the PBI.

Example 1

A parent PBI solution was made by pulverizing 5 g of poly-2,2'(m-phenylene)-5,5'-bibenzimidazole (available commercially as CELAZOLE®) to a fine powder and placing it into a 250 mL round-bottom flask. The flask was equipped with a water-jacketed condenser, gas inlet adaptor, and magnetic stir bar. The system was placed under vacuum for five to eight hours and the system was then purged with nitrogen. Anhydrous DMAc (200 mL) was transferred to the flask and the solution was heated to boiling, with stirring, for about 24 hours. The solution was allowed to cool to room temperature.

Figure 2:
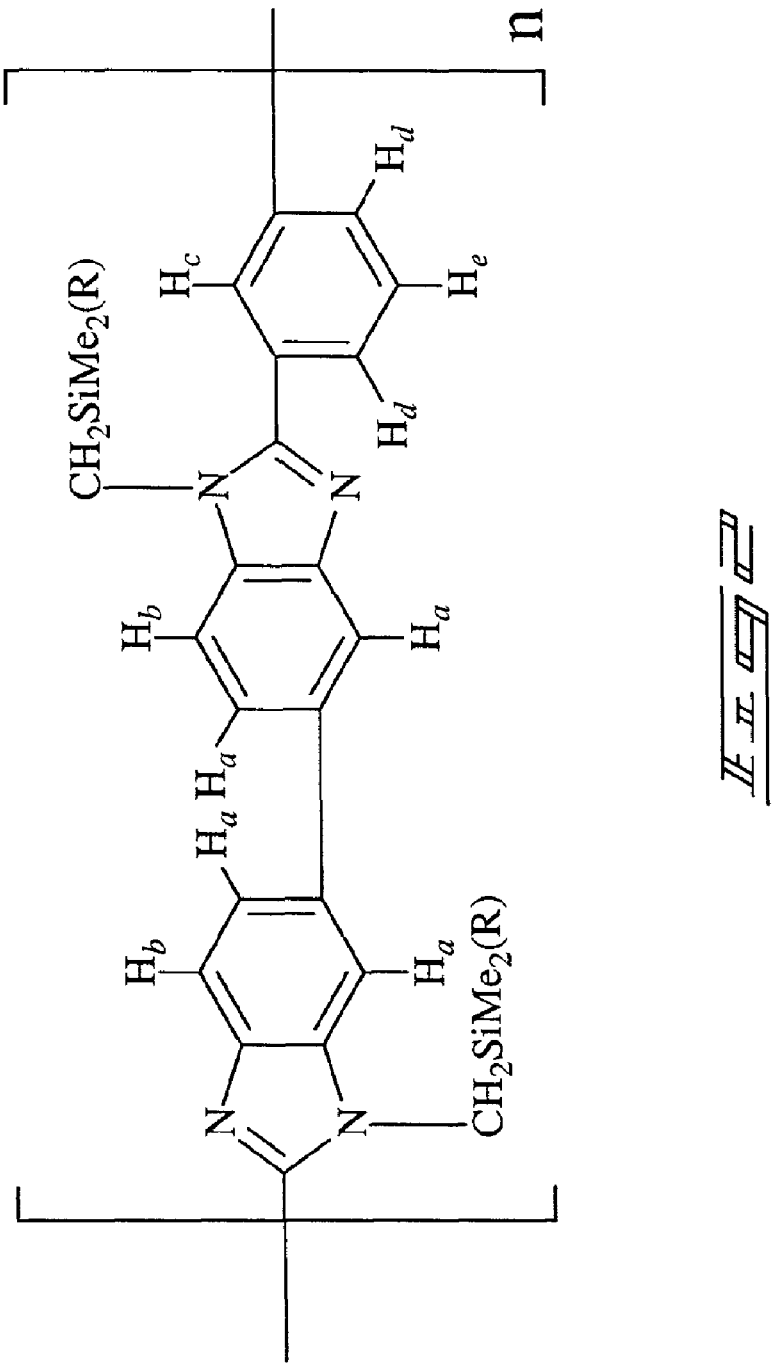
FIG. 2 shows a chemical structure of poly-2,2'(m-phenylene)-5,5'-bibenzimidazole substituted with an organic-inorganic hybrid moiety.

The cooled parent PBI solution (32 mL, 0.0013 mol of the polymer repeating unit, each having two reactive N—H sites) was filtered through a 0.45 µm PTFE filter by syringe and transferred into a 100 mL round-bottom flask, equipped with a gas inlet adapter and magnetic stir bar and charged with nitrogen. NaH (80% in oil dispersion) (100 mg, 0.0033 mol) was directly added to the PBI solution and stirred for about six hours at room temperature. During this time, a deep red/violet color and increased viscosity of the solution was observed. After the NaH was consumed, the organohalosilane ($Me_3SiCH_2Cl$, 4 mL, 0.033 mol, thirteen equivalents per N—H site) was added via syringe to the flask. The reaction mixture color changed to a light reddish-purple/fuchsia after the organosilane addition. This solution was stirred for 48 hours at room temperature. The solution color returned to a yellowish-brown during this time. Compound 1, as shown in FIG. 2, was formed.

Upon completion, the reaction solution was transferred directly into a 600 mL beaker, filled with de-ionized, nanopure water (500 mL). The polymer immediately precipitated in water as a yellow-brown solid. The water-polymer solution was mixed well and filtered through fluted filter paper. The collected polymer was transferred to a crystallizing dish to dry overnight. The next day, the polymer was dissolved in THF (200 mL). Sonication was used to disperse and affect dissolution of the polymer in the solution. This THF solution was filtered through a 0.45 µm PTFE filter using a vacuum aspirator. The collected solids were set aside, and the yellow, polymer-containing THF solution was condensed to a minimal amount.

This solution was added drop-wise to a 600 mL beaker filled with hexanes (500 mL). The polymer precipitated as light-yellow feathery solid or light-yellow flakes. The hexanes solution was mixed well and the solids were allowed to settle. The hexanes polymer solution was decanted through a paper filter. The polymer was collected from the filter paper and dried in a vacuum oven. Yield of the substituted PBI was 50 wt % of the parent PBI, as shown in Table 1.

Figure 3:
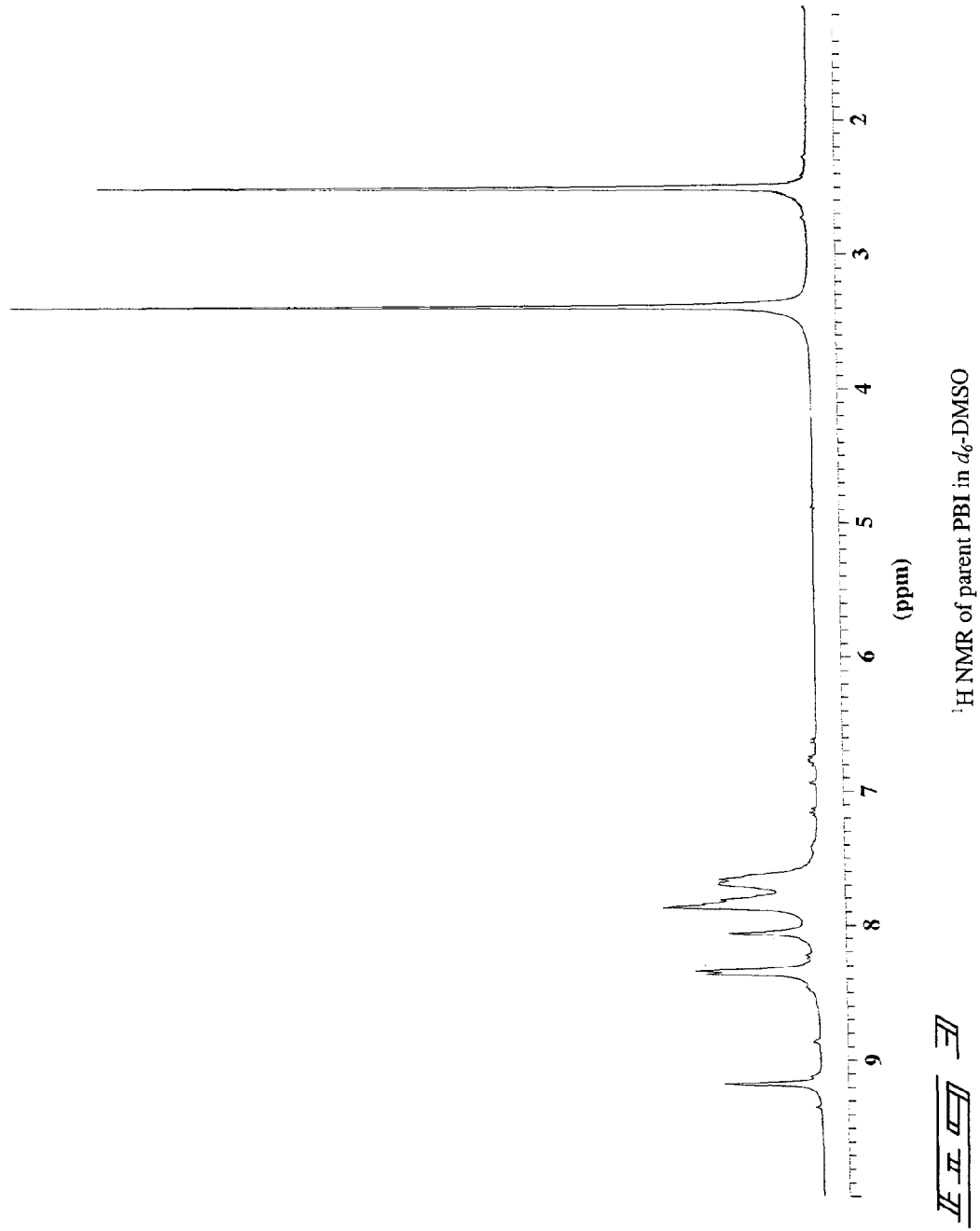
FIG. 3 shows $^1$H NMR analytical results for poly-2,2'(m-phenylene)-5,5'-bibenzimidazole.
Figure 4:
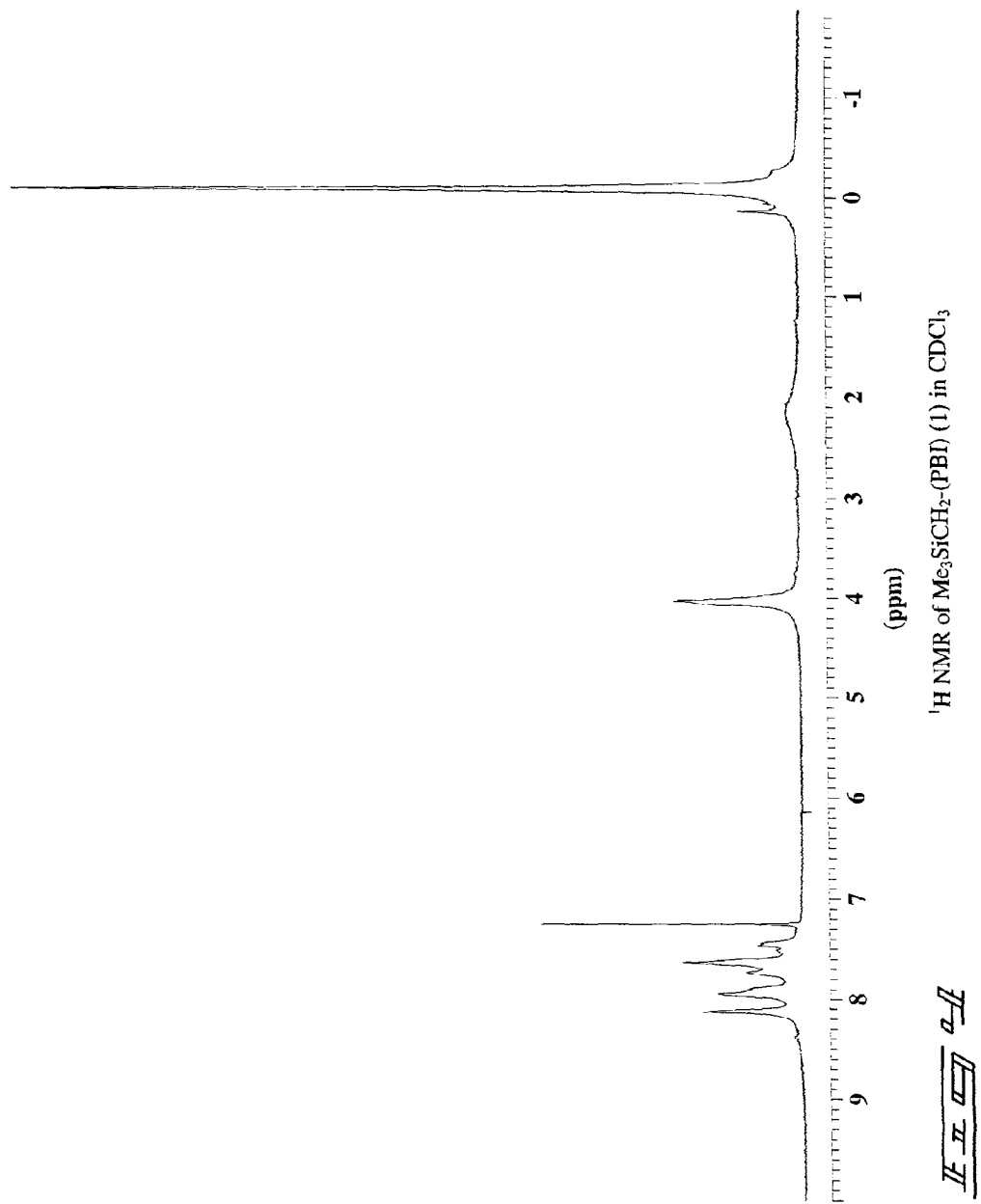
FIG. 4 shows $^1$H NMR analytical results for Me$_3$SiCH$_2$— substituted poly-2,2'(m-phenylene)-5,5'-bibenzimidazole.
Figure 8:
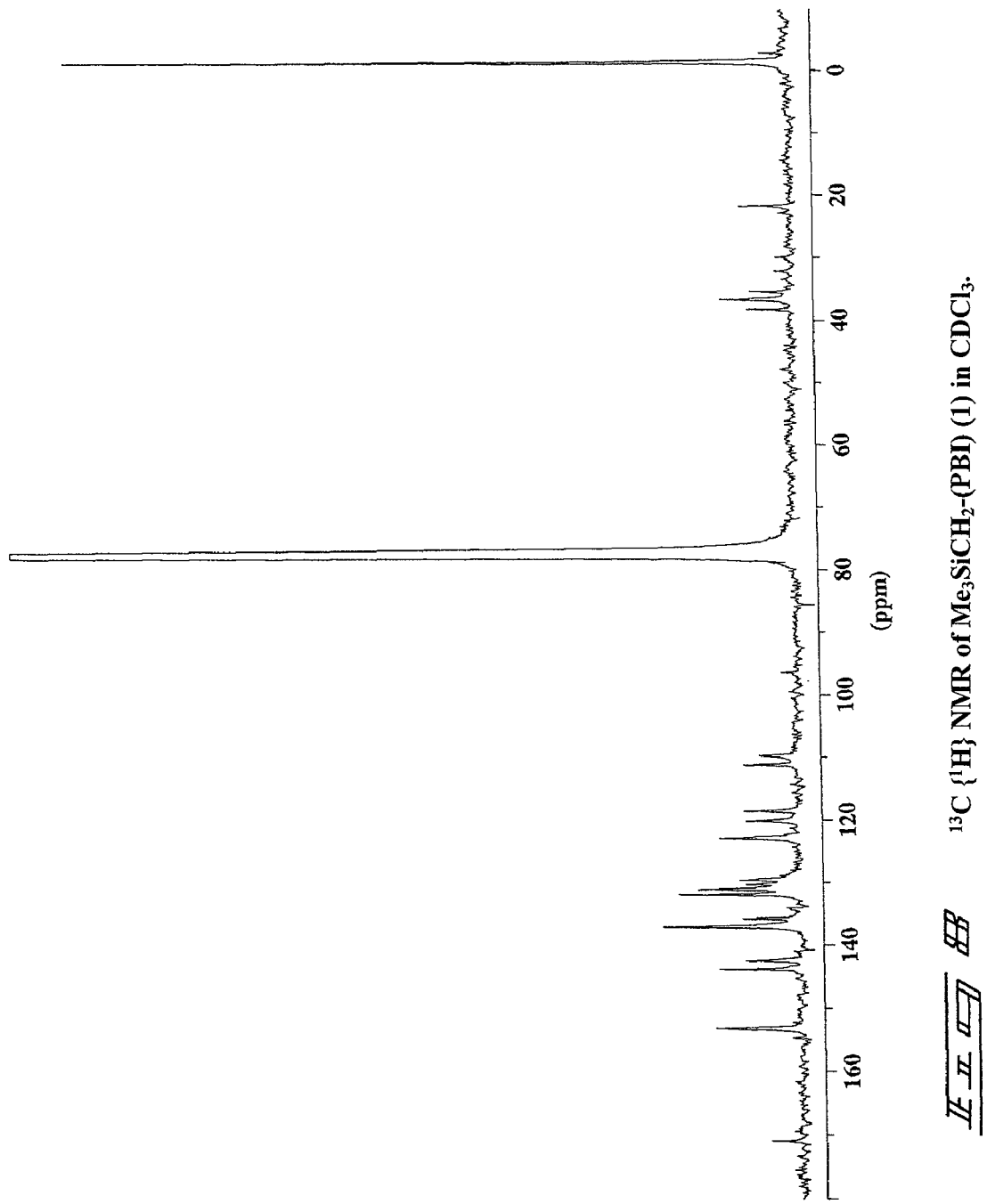
FIG. 8 shows $^{13}$C{$^1$H} NMR analytical results for Me$_3$SiCH$_2$—substituted poly-2,2'(m-phenylene)-5,5'-bibenzimidazole.

NMR analysis was used to identify the products in $CDCl_3$, as shown in FIGS. 4 and 8, and may be compared to NMR analysis of the parent PBI in $d_6$-DMSO shown in FIG. 3. $^1H$ and $^{13}C\{^1H\}$ NMR spectra were recorded on a BRUKER® DMX 300 WB spectrometer operating at 7.04 T: 300 MHz ($^1H$) and 75 MHz ($^{13}C\{^1H\}$).

A description of the parent PBI NMR spectra is as follows, with designated H atoms, such as $H_a$, $H_b$, etc., shown in FIG. 2: $^1H$ NMR δ ($d_6$-DMSO)=(s, $H_a$, 2H) 9.17, (broad multiplet, $H_b$, 2H) 8.30-8.38, (s, $H_c$, 2H) 8.06, (broad multiplet, $H_d$, 1H) 7.75-7.90, (broad multiplet, $H_e$, 1H) 7.60-7.75; $^{13}C\{^1H\}$ NMR δ ($d_6$-DMSO) (s, aromatic) 153.1, (s, aromatic) 143.8, (s, aromatic) 142.5, (s, aromatic) 137.0, (s, aromatic) 135.8, (s, aromatic) 131.9, (s, aromatic) 131.0, (s, aromatic) 130.3, (s, aromatic) 129.6, (s, aromatic) 122.9, (s, aromatic) 120.1, (s, aromatic) 118.5, (s, aromatic) 111.1, (s, aromatic) 109.7.

A description of the substituted PBI (compound 1) NMR spectra is as follows, with designated H atoms, such as $H_a$, $H_b$, etc., shown in FIG. 2: $^1H$ NMR δ ($CDCl_3$)=(broad multiplet, $H_a$, 2H) 8.00-8.17, (broad multiplet, $H_b$, 2H) 7.80-8.00, (broad multiplet, $H_c$, 2H) 7.70-7.80, (broad multiplet, $H_d$, 1H) 7.57-7.70, (broad multiplet, $H_e$, 1H) 7.40-7.50, (broad multiplet, $CH_2$, 2H) 3.90-4.10, (s, $Si(CH_3)_3$, 9H) −0.09; $^{13}C\{^1H\}$ NMR δ ($CDCl_3$)=(s, aromatic) 153.1, (s, aromatic) 143.8, (s, aromatic) 142.5, (s, aromatic) 137.0, (s, aromatic) 135.8, (s, aromatic) 131.9, (s, aromatic) 131.0, (s, aromatic) 130.3, (s, aromatic) 129.6, (s, aromatic) 122.9, (s, aromatic) 120.1, (s, aromatic) 118.5, (s, aromatic) 111.1, (s, aromatic) 109.7, (s, $CH_2$) 36.6, (s, $Si(CH_3)_3$) −1.4.

Example 2

Figure 5:
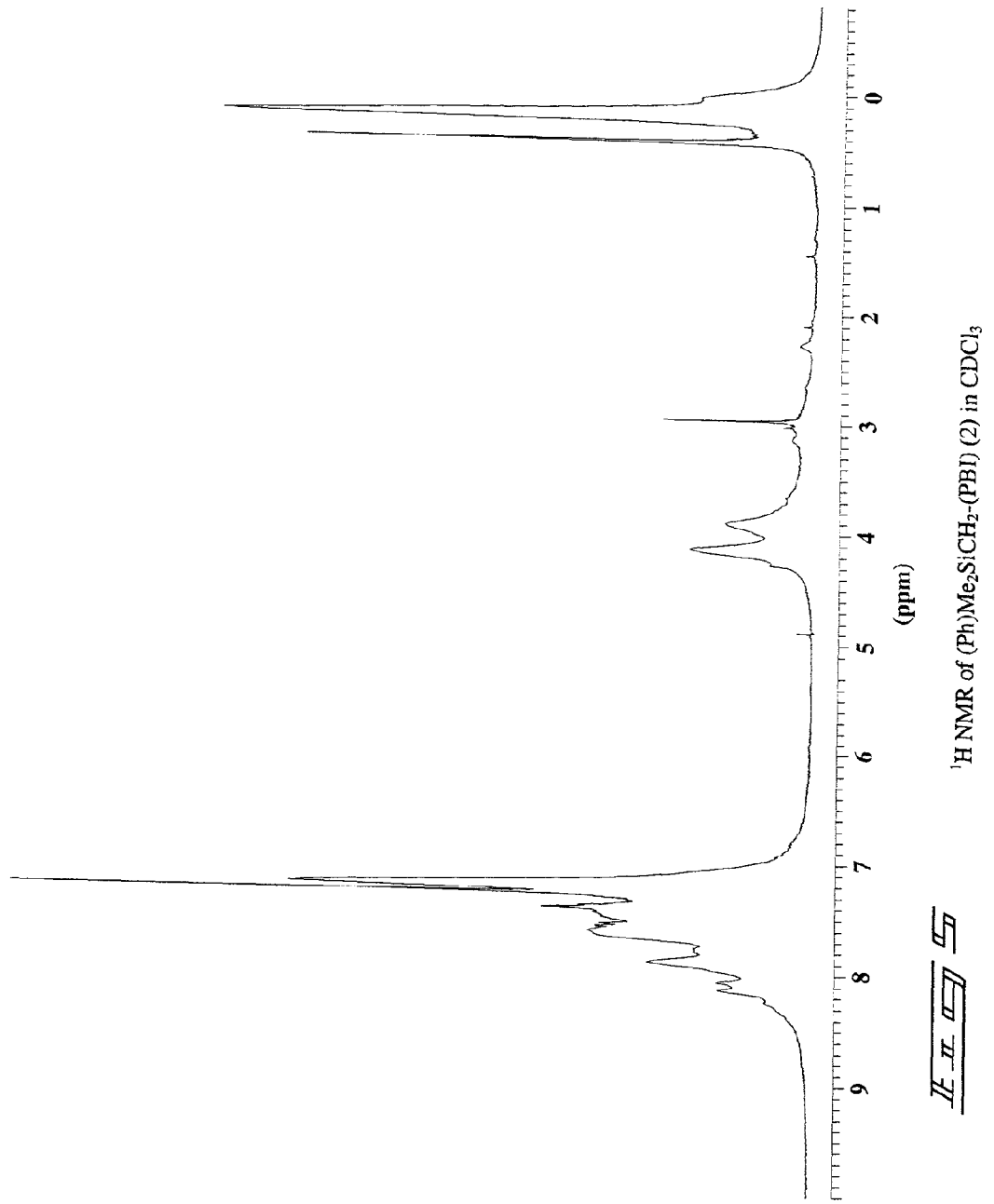
FIG. 5 shows $^1$H NMR analytical results for (Ph)Me$_2$SiCH$_2$—substituted poly-2,2'(m-phenylene)-5,5'-bibenzimidazole.

Example 1 was repeated using $(Ph)Me_2SiCH_2Cl$ (5 mL, 0.028 mol, eleven equivalents per N—H site) as the organohalosilane, forming compound 2 shown in FIG. 2. Yield of the substituted PBI was 15 wt % of the parent PBI, as shown in Table 1. Yield may be lower in comparison to the syntheses for compounds 1, 3, and 4 due to the steric size of the organohalosilane and its inability to access deprotonated nitrogens on the parent PBI. NMR analysis was used to identify the products in $CDCl_3$, as shown in FIG. 5. A description of the substituted PBI (compound 2) NMR spectra is as follows, with designated H atoms, such as $H_a$, $H_b$, etc., shown in FIG. 2: $^1H$ NMR δ ($CDCl_3$)=(broad multiplet, aromatic) 8.45-8.75, (broad multiplet, aromatic) 8.20-8.45, (broad multiplet, aromatic) 7.95-8.20, (broad multiplet, aromatic) 7.75-7.95, (broad multiplet, aromatic) 7.50-7.75, (broad multiplet, $CH_2$, 1H) 4.50-4.80, (broad multiplet, $CH_2$, 1H) 4.50-4.25, (s, $Si(CH_3)_2$, 6H) 0.68.

Example 3

Figure 6:
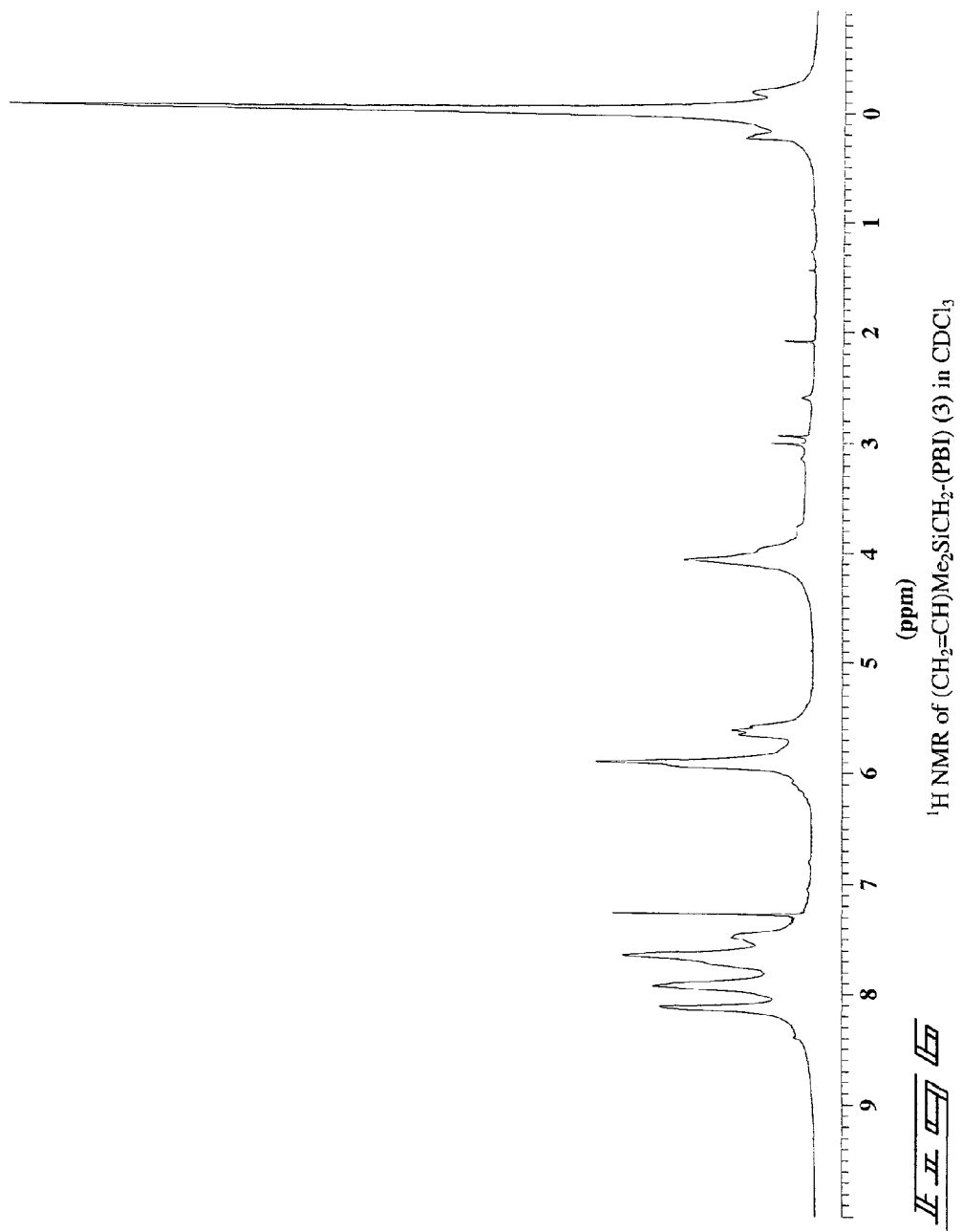
FIG. 6 shows $^1$H NMR analytical results for (CH$_2$=CH)Me$_2$SiCH$_2$—substituted poly-2,2'(m-phenylene)-5,5'-bibenzimidazole.

Example 1 was repeated using $(CH_2\!\!=\!\!CH)Me_2SiCH_2Cl$ (6 mL, 0.040 mol, fifteen equivalents per N—H site) as the organohalosilane, forming compound 3 shown in FIG. 2. Yield of the substituted PBI was 50 wt % of the parent PBI, as shown in Table 1. NMR analysis was used to identify the products in $CDCl_3$, as shown in FIG. 6. A description of the substituted PBI (compound 3) NMR spectra is as follows, with designated H atoms, such as $H_a$, $H_b$, etc., shown in FIG. 2: $^1H$ NMR δ ($CDCl_3$)=(broad multiplet, $H_a$, 2H) 8.00-8.17, (broad multiplet, $H_b$, 2H) 7.80-8.00, (broad multiplets, $H_c$ and $H_d$, 3H) 7.65-7.80, (broad multiplet, $H_e$, 1H) 7.30-7.40, (broad multiplet, $CH_2\!\!=\!\!CH$, 2H) 5.95-5.80, (broad multiplet, $CH_2\!\!=\!\!CH$, 1H) 5.55-5.65, (broad multiplet, $CH_2$, 2H) 3.90-4.10, (s, $Si(CH_3)_2$, 6H) 0.00.

Example 4

Figure 7:
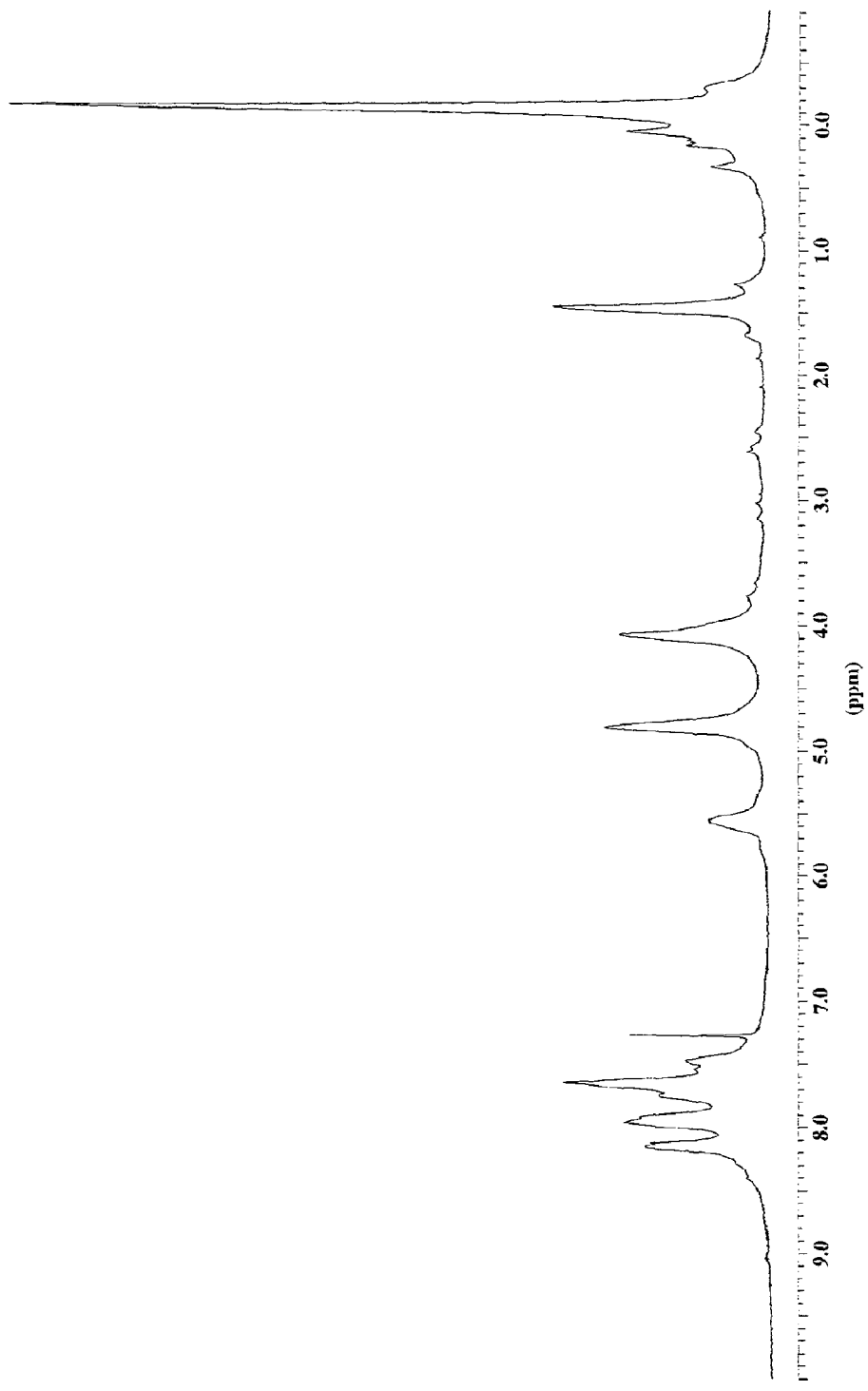
FIG. 7 shows $^1$H NMR analytical results for (CH$_2$=CHCH$_2$)Me$_2$SiCH$_2$—substituted poly-2,2'(m-phenylene)-5,5'-bibenzimidazole.

Example 1 was repeated using $(CH_2\!\!=\!\!CHCH_2)Me_2SiCH_2Cl$ (5.5 mL, 0.034 mol, thirteen equivalents per N—H site) as the organohalosilane, forming compound 4 shown in FIG. 2. Yield of the substituted PBI was 50 wt % of the parent PBI, as shown in Table 1. NMR analysis was used to identify the products in $CDCl_3$, as shown in FIG. 7. A description of the substituted PBI (compound 4) NMR spectra is as follows, with designated H atoms, such as $H_a$, $H_b$, etc., shown in FIG. 2: $^1H$ NMR δ ($CDCl_3$)=(broad multiplet, $H_a$, 2H) 8.05-8.20, (broad multiplet, $H_b$, 2H) 7.80-8.00, (broad multiplets, $H_c$ and $H_d$, 3H) 7.65-7.80, (broad multiplet, $H_e$, 1H) 7.30-7.40, (broad multiplet, $CH_2\!\!=\!\!CH$, 2H) 5.50-5.70, (broad multiplet, $CH_2\!\!=\!\!CH$, 1H) 4.75-4.85, (broad multiplet, $CH_2$, 2H) 3.90-4.10, (broad multiplet, $CH_2$, 2H) 1.40-1.55, (s, $Si(CH_3)_2$, 6H) 0.00.

Example 5

Molecular Weight Analysis

Dilute solution techniques were used to characterize the macromolecular structure of the polymers and 0.2 μm-filtered THF was used as the solvent. The analyses were performed at a temperature of 25° C. Solution refractive index increment, dn/dc values were obtained using a Rainin DYNAMAX® RI-1 refractive index detector. High-performance size-exclusion chromatography (HPSEC) was performed using a Waters Model 2690 solvent/sample delivery system with a column bank of two STYRAGEL® HR 5E (4.6 mm id.×300 mm) solvent efficient columns. The columns were kept isothermal and operated with a solvent flow rate of 0.3 mL/min. The polymer solutions were filtered through a 0.45 μm filter prior to injection onto the columns. Detection was achieved using a Wyatt Technologies DAWN-EOS laser light scattering detector with the K5 flow cell that measures scattered light intensities at angles ranging from 14.7° to 158.2°. The DYNAMAX® RI-1 refractive index detector was placed in series with the light scattering detector as a concentration detector. Weight average molecular weight ($M_w$) and number average molecular weight ($M_n$) were determined and the polydispersity index (PDI) ($M_w/M_n$) was calculated as an indication of the distribution of individual molecular weights in the batch of polymers. Data are summarized in Table 1.

TABLE 1

Macromolecular Structure Determination and Yield.

| Polymer | Molecular Weight (g/mol) | PDI ($M_w/M_n$) | Yield (percent) |
|---|---|---|---|
| Parent PBI | 20,000$^a$ | $^b$ | $^c$ |
| $Me_3SiCH_2$--(PBI) (1) | 254,000 | 5.27 ± 2.44 | 50 |
| $(Ph)Me_2SiCH_2$--(PBI) (2) | $^d$ | $^d$ | 15 |
| $(CH_2\!\!=\!\!CH)Me_2SiCH_2$--(PBI) (3) | 274,000 | 1.15 ± 0.12 | 50 |
| $(CH_2\!\!=\!\!CHCH_2)Me_2SiCH_2$--(PBI) (4) | $^d$ | $^d$ | 50 |

$^a$From the manufacturer.
$^b$Unknown.
$^c$Not applicable (starting material).
$^d$To be determined.

Example 6

Thermal Analysis

Thermal analyses were obtained using a TA Instruments Model 2910 differential scanning calorimeter (DSC) and a TA Instruments Model 2950 thermogravimetric analyzer (TGA). As indications of thermal stability, an attempt was made to determine $T_g$ and melt transition temperature ($T_m$). Compounds 3 and 4 showed endothermic transitions close to a temperature of 77° C. in the DSC, suggesting that minute quantities of solvent (THF, hexanes, and/or water) not detectable by NMR may have been present. Compounds 3 and 4 also showed small exotherms in the DSC at respective temperatures of 249° C. and 239° C. This possibly indicates that the alkene groups were polymerizing and/or cross-linking. As another indication of thermal stability, a determination was made of the temperature at which onset of decomposition occurred. Data are summarized in Table 2.

TABLE 2

Differential Scanning Calorimetry and Thermal Gravimetric Analysis Data.

| Polymer | $T_g$ and/or $T_m$ | Initial Weight Loss Temperature in $N_2$ |
|---|---|---|
| Parent PBI | $T_g$ = 435° C.$^a$ | 512° C. |
| $Me_3SiCH_2$--(PBI) (1) | $^b$ | 448° C. |
| $(Ph)Me_2SiCH_2$--(PBI) (2) | $^b$ | 430° C. |
| $(CH_2\!\!=\!\!CH)Me_2SiCH_2$--(PBI) (3) | T = 249° C. (exotherm) | 474° C. |
| $(CH_2\!\!=\!\!CHCH_2)Me_2SiCH_2$--(PBI) (4) | T = 239° C. (exotherm) | 451° C. |

$^a$From manufacturer.
$^b$No detectable endotherm up to 500° C.

Example 7

Gas Permeability

Figure 10:
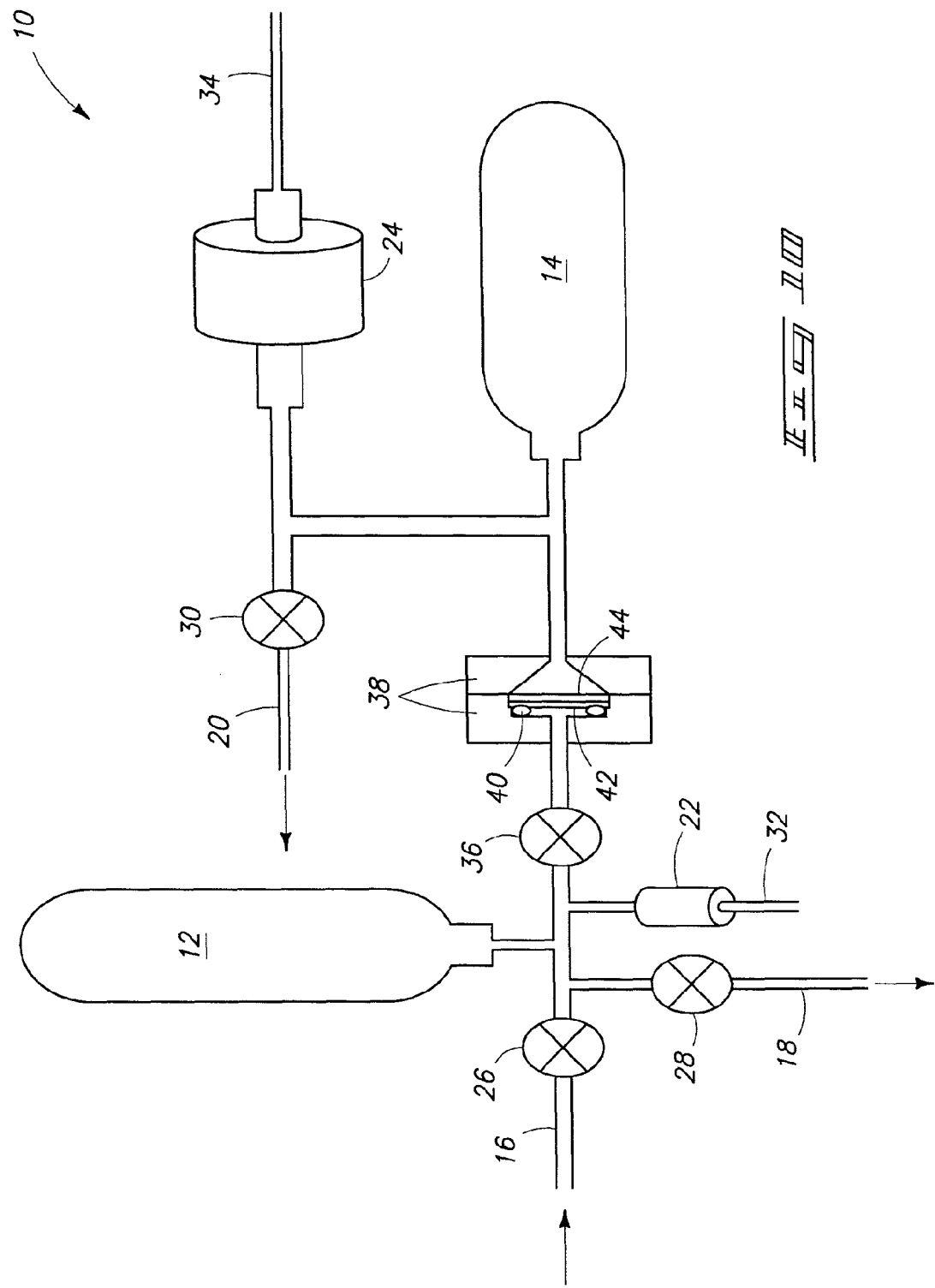
FIG. 10 shows a schematic representation of a time-lag, pure gas permeability measurement method.

Gas permeability testing was performed using a time-lag method. Membranes were exposed to six different gases: He, $H_2$, $N_2$, $O_2$, $CH_4$ and $CO_2$. The interactions of the test gases and the polymer membranes were interpreted using a solution-diffusion model. FIG. 10 provides a schematic representation of a time-lag, pure gas permeability measurement apparatus.

Turning to FIG. 10, a measurement apparatus 10 includes a membrane 42 formed on a porous support 44 and placed in a test cell 38 against O-ring 40, so as to seal a feed side of membrane 42 from a permeate side. Both sides of the membrane 42 (including associated tubing, a feed reservoir 12, and a permeate reservoir 14) were evacuated to an equal vacuum using vacuum lines 18 and 20 with vacuum valves 28 and 30 open. Vacuum valves 28 and 30, along with an isolation valve 36, were then closed, isolating test cell 38. Measurement apparatus 10 was checked for leaks, and the drift in pressure readings, if any, was characterized. A pressure baseline, at zero time on the permeate side of membrane 42, was noted using a differential pressure transducer 24 providing a data signal through a data line 34. A feed valve 26 was opened and feed reservoir 12 was filled through a feed line 16 to a desired initial feed pressure of the test gas, as indicated by a differential pressure transducer 22 providing a data signal through a data line 32. Next, isolation valve 36 was opened, exposing the feed side of membrane 42 to the test gas. The pressure build-up on the permeate side of the membrane 42, as a function of time, was recorded. Previous to the testing, the volume of both the feed and permeate reservoirs 12, 14, respectively, and the associated tubing, etc., on the permeate side of membrane 42 was well characterized to allow accurate calculations from the test data. The two values determined directly from the pure gas test system included time-lag and permeability.

Permeability is the rate at which a gas permeates through a membrane after the gas comes to equilibrium in a polymer.

Permeabilities for these experiments were calculated using the following equations, where test system volume is V (in $cm^3$), test system feed gas initial pressure is $p_1$ (in cm Hg), test system temperature is T (in ° C.), membrane thickness is l (in cm), and membrane area exposed to the feed gas is A (in $cm^2$). Slope was determined from a least squares fitted line of the time (in sec) versus permeate gas pressure (in cm Hg) steady state data set (data during equilibrium flux) obtained using the above method.

$$P = \text{slope} \frac{V}{76} \frac{273}{(273+T)} \frac{1}{A} \frac{l}{P_1}. \quad \text{Equation 2}$$

Time-lag is an intercept of a permeate gas initial pressure baseline and the least square fitted line for a data set. Given the slope and pressure axis intercept from the least square fitted line according to a y=ax+b formula, wherein pressure=slope× time+intercept, time-lag may be calculated using:

$$t = \text{timelag} = \frac{\text{baseline} - \text{intercept}}{\text{slope}}. \quad \text{Equation 3}$$

and then the determined value for the time-lag used to calculate the diffusivity D.

$$D = \frac{l^2}{6t}. \quad \text{Equation 4}$$

Gas solubility is algebraically calculated from the measured quantities of permeability and diffusivity using Equation 1. Data are summarized in Table 3.

TABLE 3

Gas Testing Permeability.[a]

| Polymer | $H_2$ | Ar | $N_2$ | $O_2$ | $CH_4$ | $CO_2$ |
|---|---|---|---|---|---|---|
| Parent PBI @ 30° C. | 3.9 | 0.073 | 0.049 | 0.086 | 0.04 | 0.07 |
| Parent PBI @ 55° C. | 5.7 | 0.07 | 0.09 | 0.31 | 0.11 | 0.25 |
| $Me_3SiCH_2$-(PBI) (1) | 127.2 | 15.2 | 10.4 | 21.6 | 13.1 | 59.0 |
| $(Ph)Me_2SiCH_2$-(PBI) (2) | b | b | b | b | b | b |
| $(CH_2{=}CH)Me_2SiCH_2$-(PBI) (3) | 32 | c | c | c | 9 | 24 |
| $(CH_2{=}CHCH_2)Me_2SiCH_2$-(PBI) (4) | 148 | c | c | c | 66 | 75 |

$$10^{-10} \cdot \left( \frac{cm^3_{gas\text{-}STP} \times cm}{cm^3 \times \sec \times cm\ Hg} \right).$$

[a]Permeabilities in Barrers,
[b]To be determined.
[c]Not tested.

From initial introduction of a feed gas to the membrane, permeate pressure increases in a non-linear manner until the gas comes to equilibrium in the polymer. After reaching equilibrium, permeate pressure increases linearly with respect to time. Time-lag is the time during equilibrium flux that it takes the gas to permeate from a feed side of the membrane to a permeate side of the membrane and is used to calculate diffusivity. The basic relationship of the gas transport properties, permeability (P), solubility (S), and diffusivity (D) in polymeric membranes is expressed in the following terms:

P=DS  Equation 1.

Example 8

Solvent Solubility

Quantitative solvent solubility testing was performed in THF, chloroform, and dichloromethane. Qualitative observations of solubility were made for DMAc and NMP. Unless otherwise indicated, the solvent solubility data was obtained thirty minutes after addition to the solvent at room temperature or an otherwise indicated temperature.

TABLE 4

Solvent Solubility.

| Polymer | Solubility - grams/mL of Solvent | | | | |
|---|---|---|---|---|---|
| | THF | CHCl$_3$ | CH$_2$Cl$_2$ | DMAc | NMP |
| Parent PBI[a] | Not Soluble | Not Soluble | Not Soluble | Partially soluble | Partially soluble |
| Me$_3$SiCH$_2$---(PBI) (1) | 0.2-0.25 | 0.2-0.25[b] | 0.01-0.05 | Soluble | Soluble |
| (Ph)Me$_2$SiCH$_2$---(PBI) (2) | c | c | c | c | c |
| (CH$_2$=CH)Me$_2$SiCH$_2$---(PBI) (3) | 0.2-0.25 | 0.2-0.25[b] | Swells, Slightly Soluble | Soluble | Soluble |
| (CH$_2$=CHCH$_2$)Me$_2$SiCH$_{2gp}$---(PBI) (4) | 0.2-0.25 | 0.2-0.25[b] | Swells, Slightly Soluble | Soluble | Soluble |

[a]Soluble in DMSO; partially soluble in DMF; 0.05-0.06 g/mL in formic acid. (Vogel, et al, J. Polym. Sci., vol. 50, pg. 511, 1961).
[b]Elevated temperature (~50° C.) and constant stirring.
[c]Not tested.

A number of observations may be made from the above Examples. From the NMR analysis, the integration ratios of the $^1$H NMR spectra show that roughly 100% of the PBI is substituted with the organosilane. The unsubstituted imidazole (N—H) is apparent in the $^1$H NMR spectrum of the parent PBI at 9.2 ppm (FIG. 3), but does not appear in the spectra of the substituted PBI (FIGS. 4-8). The organosilane methylene group bonded to the PBI is easily determined from both $^1$H NMR (~4.00 ppm) and $^{13}$C{$^1$H} NMR (~35-40 ppm) spectra. However, the methylene group on compound 2 has limited rotational freedom and is split into two peaks. Compounds 1, 3 and 4 produce one peak for this region. The methyl groups on silicon for compounds 1-4 are roughly at 0.00 ppm for both $^1$H NMR and $^{13}$C{$^1$H} NMR spectra. The functional groups on compound 2 (phenyl), compound 3 (vinyl), and compound 4 (allyl) can be clearly assigned for the $^1$H NMR spectra, but assignment in the $^{13}$C{$^1$H} NMR spectra is rather difficult because of the other aromatic carbons. In the aromatic region, four aromatic peaks are very similar in the $^1$H NMR spectra among compounds 1-4 and the parent PBI spectra. Accordingly, all of the NMR data implies that compounds 1-4 are substituted PBI.

The molecular weights of compounds 1-4 in Table 1 are an order of magnitude higher than the manufacturer's value for the parent PBI. This suggests that the parent PBI may have a higher molecular weight than indicated by the manufacturer or the PBI may cross-link during the synthetic modification. Table 1 also shows a large polydispersity index ($M_w/M_n$) for the substituted PBI. This suggests that the parent PBI starting material does not have a narrow molecular weight range and that the manufacturer's value may exclude some of the larger molecular weights.

The thermal gravimetric data of compounds 1-4 in Table 2 shows thermal properties similar to the parent PBI polymer. The temperatures marking the onset of decomposition (initial weight loss) for the substituted PBI are within a temperature of 82° C. of the parent PBI. Thus, temperatures for all of compounds 1-4 are within 20% of the temperature for the parent PBI. The temperature for compound 3 is within 10% of the temperature of the parent PBI. The differential scanning calorimetry data did not reveal an identifiable $T_g$ for compounds 1-4 at a temperature of 500° C. or less. From the literature, the parent PBI does not exhibit a $T_m$ because it decomposes at higher temperatures. In the same respect, none of compounds 1-4 show a $T_m$.

The gas testing of compounds 1-4 presents throughput values that are orders of magnitude better than the parent PBI (Table 3). However, not all of the gases are affected to the same extent. The H$_2$ and CO$_2$ values are the largest for compounds 1 and 4, while the other gas values are lower.

As may be appreciated from the description herein, the compounds, materials, and methods according to the aspects of the invention provide a number of advantages in comparison to known compounds, materials, and methods.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A polybenzimidazole (PBI) compound comprising: imidazole nitrogens, at least a portion of which are substituted with a moiety having the formula (R)$_n$MR'—, wherein n is 1, 2, or 3, each R is independently selected from among alkyl, aryl, alkenyl, alkynyl, and oxide, M is metal, semi-metal, or phosphorous, and R' is C$_1$ to C$_{20}$ alkyl.

2. The polybenzimidazole compound of claim 1, wherein the polybenzimidazole compound comprises substituted poly-2,2'(m-phenylene)-5,5'-bibenzimidazole.

3. The polybenzimidazole compound of claim 1, wherein at least 85% of the imidazole nitrogens are substituted with the moiety.

4. The polybenzimidazole compound of claim 1, wherein substantially all of the imidazole nitrogens are substituted with the moiety.

5. The polybenzimidazole compound of claim 1, wherein the moiety comprises an organosilane moiety.

6. The polybenzimidazole compound of claim 1, wherein M is selected from the group consisting of silicon and at least one element selected from the group consisting of scandium, yttrium, titanium, zirconium, hafnium, vanadium, niobium, molybdenum, tungsten, iron, ruthenium, cobalt, rhodium, nickel, palladium, platinum, boron, aluminum, gallium, indium, germanium, tin, phosphorous, arsenic, antimony, selenium, and tellurium.

7. The polybenzimidazole compound of claim 1, wherein the moiety comprises $(R)Me_2SiCH_2$—, wherein R is selected from the group consisting of methyl, phenyl, vinyl, and allyl.

8. The polybenzimidazole compound of claim 1, wherein the polybenzimidazole compound exhibits a temperature marking an onset of decomposition that is greater than a value representing 80% of a temperature marking an onset of decomposition of the polybenzimidazole compound without substitution.

9. The polybenzimidazole compound of claim 1, wherein the polybenzimidazole compound exhibits a solubility in an organic solvent greater than the solubility of the polybenzimidazole compound without substitution.

10. The polybenzimidazole compound of claim 1, wherein the polybenzimidazole compound exhibits a solubility in tetrahydrofuran (THF), chloroform, or dichloromethane of at least about 0.01 g/mL.

11. A polybenzimidazole compound comprising: imidazole nitrogens, at least a portion of which are substituted with $(R)Me_2Si(CH_2)$—, wherein R is selected from the group consisting of methyl, phenyl, vinyl, and allyl.

12. The polybenzimidazole compound of claim 11, wherein the polybenzimidazole compound comprises substituted poly-2,2'(m-phenylene)-5,5'-bibenzimidazole.

13. The polybenzimidazole compound of claim 12, wherein R is methyl.

14. The polybenzimidazole compound of claim 12, wherein R is phenyl.

15. The polybenzimidazole compound of claim 12, wherein R is vinyl.

16. The polybenzimidazole compound of claim 12, wherein R is allyl.

17. A polybenzimidazole compound comprising imidazole nitrogens, at least a portion of which are substituted with $(R)_nMR'X$, wherein n is 1, 2, or 3, each R is independently selected from among alkyl, aryl, alkenyl, alkynyl, and oxide, M is metal, semi-metal, or phosphorous, R' is $C_1$ to $C_{20}$ alkyl, and X is Cl, Br, or I.

18. The polybenzimidazole compound of claim 17, wherein M is selected from the group consisting of at least one element selected from the group consisting of scandium, yttrium, titanium, zirconium, hafnium, vanadium, niobium, molybdenum, tungsten, iron, ruthenium, cobalt, rhodium, nickel, palladium, platinum, boron, aluminum, gallium, indium, silicon, germanium, tin, phosphorous, arsenic, antimony, selenium, and tellurium.

* * * * *

UNITED STATES PATENT AND TRADEMARK OFFICE
CERTIFICATE OF CORRECTION

PATENT NO. : 7,772,361 B2
APPLICATION NO. : 11/772868
DATED : August 10, 2010
INVENTOR(S) : John R. Klaehn et al.

Page 1 of 1

It is certified that error appears in the above-identified patent and that said Letters Patent is hereby corrected as shown below:

In the specification:

COLUMN 12, LINE 12, change " $P = \text{slope} \frac{V}{76} \frac{273}{(273+T)} \frac{1}{A} \frac{1}{p_1}$ " to -- $P = (slope)\left(\frac{V}{76}\right)\left(\frac{273}{(273+T)}\right)\left(\frac{1}{A}\right)\left(\frac{l}{p_1}\right)$ --

COLUMN 12, LINE 12, change "Equation 2" to --Equation 2.--

COLUMN 12, LINE 22, change " $\frac{\text{baseline} - \text{intercept}}{\text{slope}}$ " to -- $\frac{\text{baseline} - \text{intercept}}{\text{slope}}$ --

COLUMN 12, LINE 22, change "Equation 3" to --Equation 3.--

COLUMN 12, LINE 31, change " $D = \frac{l^2}{6t}$ " to -- $D = \frac{l^2}{6t}$ --

COLUMN 12, LINE 31, change "Equation 4" to --Equation 4.--

COLUMN 12, LINE 43, change "@" to --at--

COLUMN 12, LINE 44, change "@" to --at--

COLUMN 12, LINE 50, delete " $10^{-10} \bullet \left(\frac{cm^3_{gas\text{-}STP} \times cm}{cm^3 \times \sec \times cm\ Hg}\right)$ "

COLUMN 12, LINE 52, change "Barrers," to --Barriers, $10^{-10} \bullet \left(\frac{cm^3_{gas\text{-}STP} \times cm}{cm^3 \times \sec \times cm\ Hg}\right)$ --

Signed and Sealed this
Twenty-seventh Day of August, 2013

Teresa Stanek Rea
*Acting Director of the United States Patent and Trademark Office*